Nov. 18, 1930.  J. F. ANIOL  1,781,865
VEHICLE LAMP
Filed April 23, 1928  2 Sheets-Sheet 1
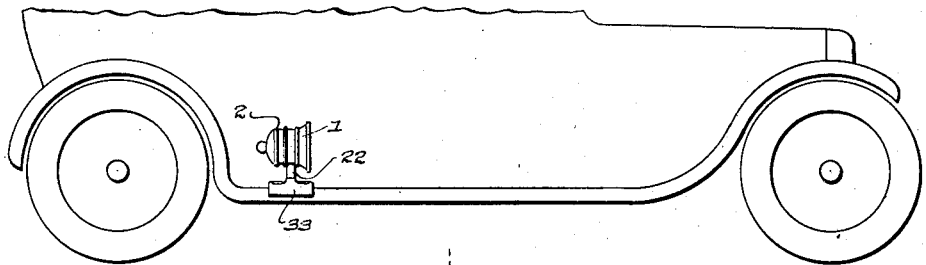
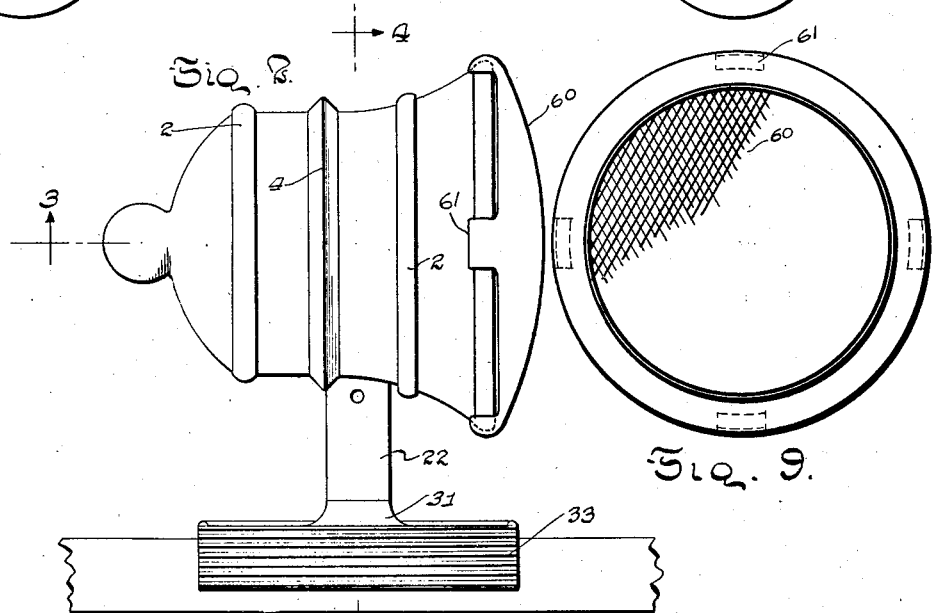
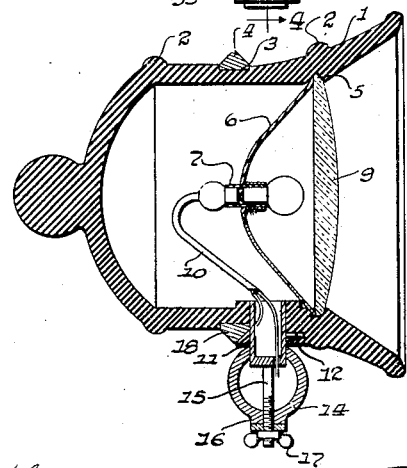
Witness
William P. Kilroy
Inventor
John F. Aniol
By John E. Gardner.
Att'y Nov. 18, 1930.  J. F. ANIOL  1,781,865
VEHICLE LAMP
Filed April 23, 1928  2 Sheets-Sheet 2
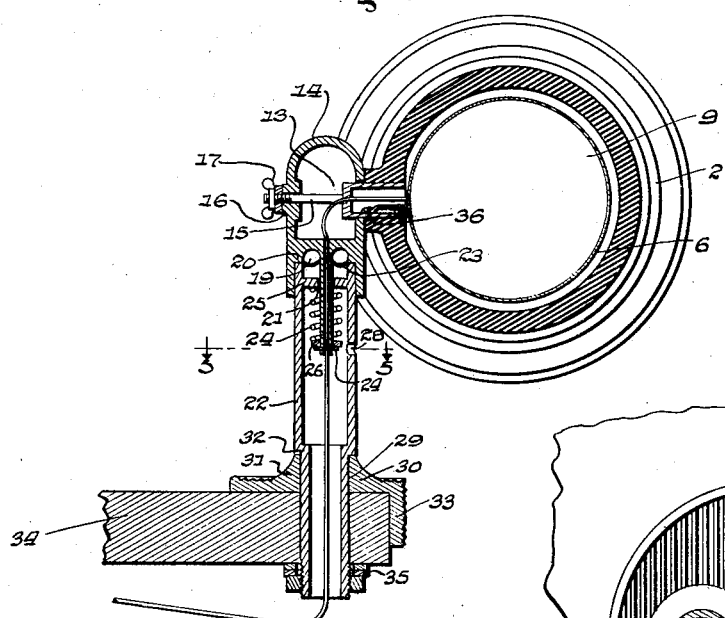
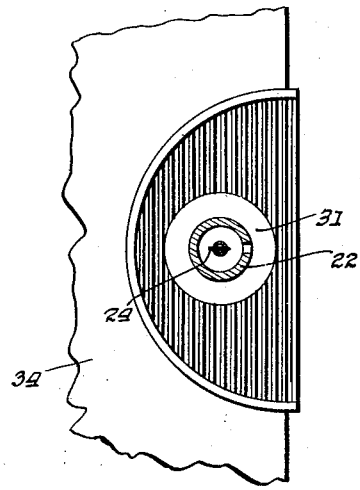
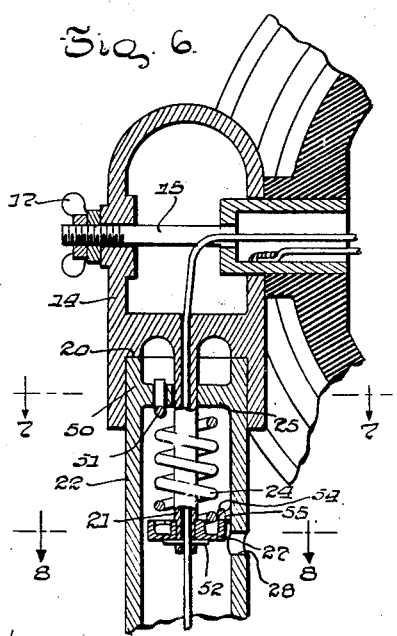
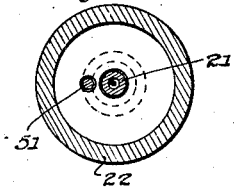
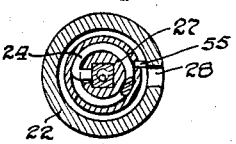
Inventor,
John F. Aniol
By John E. Gardner
Atty.
Witness
William P. Kilroy Patented Nov. 18, 1930

1,781,865

UNITED STATES PATENT OFFICE

JOHN F. ANIOL, OF CHICAGO, ILLINOIS

VEHICLE LAMP

Application filed April 23, 1928. Serial No. 272,168.

The present invention relates in general to vehicle lamps and more particularly to lamps which are commonly designated as spot lights or road lamps.

It is an object of my invention to prove a road lamp that will be adapted for mounting on an automobile or other vehicle in a novel manner whereby it will throw a beam of light in such direction as to show up the road to the best advantage and without inconveniencing the drivers of approaching vehicles.

Another object is to provide a swivel mounting for a road lamp so that it will be adapted to swing back from its normal projecting position out of the way in contacting with an obstructing object.

Another object is to provide a road lamp of such construction that it will stand jars and hard impacts without damage to any part of the lamp.

Another object is to provide a road lamp of such construction that it will not mar the finish of the vehicle in the event that it is swung back into contact with the vehicle body.

Another object is to provide a road lamp that may also be employed for a backing light if desired.

Another object is to provide a special mounting for a vehicle lamp so that it may be adjusted easily to any desired position, where it will remain.

A further object is to provide a special swivel mounting for my improved road lamp arranged to hold the lamp in such manner that it will yield to impact or collision without damage and will return to its adjusted position when the contact ceases.

There are other objects of my invention which together with the foregoing, will be described in the detailed specification which is to follow taken in conjunction with the accompanying drawings forming a part thereof.

In practicing my invention I provide a soft tough rubber casing of a general cylindrical or bullet shape into which is fitted a reflector and lamp. The unit is mounted resiliently on a bracket which in turn is suitably mounted on the running board of an automobile or other vehicle. The lamp casing projects over the front of the running board in such position as to throw a beam of light directly past the right front wheel in a direction to show up the right hand side of the road very clearly.

Referring now to the drawings comprising Figs. 1 to 8, inclusive:

Fig. 1 is a side elevation on my improved road light mounted in position on the running board of a car;

Fig. 2 is another side elevation showing my road light on a larger scale;

Fig. 3 is a cross section of the road lamp along the line 3—3 of Fig. 2 looking in the direction of the arrows;

Fig. 4 is a medial vertical section of the road lamp and mounting bracket showing the position of the lamp offset from the bracket;

Fig. 5 is a section of the bracket along the line 5—5 of Fig. 4 showing a plan view of the mounting plate;

Fig. 6 is a medial vertical section of a modified form of mounting bracket for my improved road lamp in which a returning spring is employed to maintain the lamp in the desired position;

Fig. 7 is a section of the modified bracket along the line 7—7 of Fig. 6, looking in the direction of the arrows showing in detail how the spring is fastened in place;

Fig. 8 is a similar section along the line 8—8 of Fig. 6 illustrating how the other end of the returning spring is fastened.

Fig. 9 is a front elevation of my improved lamp showing a screen for protecting the glass, in place.

Referring now more particularly to Figs. 1 to 5, and 9, inclusive, I shall describe the construction of my improved road light and its attended mounting bracket for properly positioning it on the vehicle.

It will be understood that like reference characters in the various figures refer to similar parts. The reference character 1 designates a fairly thick soft tough moulded rubber casing or shell having a flaring periphery. This casing may or may not be provided with a number of upstanding flange portions 2. A recess 3 may be provided for receiving an ornamental and strengthening metal ring 4. The casing or shell is provided with a recess 5 on its inner periphery set back somewhat from the end of casing to provide holding means for a reflector 6 of any suitable shape. The reflector serves as a reinforcement for the rubber shell in addition to its usual reflecting functions. A suitable socket is made in the end of the reflector and is adapted to receive an incandescent lamp 8 of any suitable size. A lens 9 is also adapted to be mounted within the shell and to be suitably held in the recess 5 in abutting relation to the periphery of the reflector 6. A convex wire screen 60 of suitable mesh may be fastened in place over the open end of the casing 1 by the extending brackets 61 which serve to grasp rubber casing firmly. This screen serves to protect the glass lens from direct blows that might occur from stones or other objects projecting into the open and flaring end portion of the rubber casing. This protecting screen is only held by the clips 61 and may be readily removed. Energy is conveyed to the socket 7 by means of the usual conductors in the cord 10 that is led through the tubular metal member 11. The rubber shell 1 is frictionally mounted on the member 11 and anchored there by a pin 12. The tubular member 11 fits within an opening 13 in an aluminum casting 14 of cylindrical shape having a rounded end. The member 11 is provided with a reduced extending portion 15 which is threaded. The extending portion 15 is adapted to penetrate a small hole at the bottom of the opening 13. A raised portion or boss 16 is cast integrally with the casting 14 and has a milled surface that is adapted to co-operate with the thumb nut 17 to fasten the rubber shell firmly to the cylindrical casting 14. A raised stud or boss 18 is moulded into the rubber shell and is adapted to abut the cylindrical casting 14.

The casting 14 has a recessed portion 19 at its lower end, there being a corrugated ridge or cam surface 20 about the inner periphery. A central tubular pin member 21 projects beyond the casting 14 and is adapted to extend through a central opening 21' in a cylindrical metal casting 22 which is preferably of aluminum. This casting is tubular with a reduced end portion providing the opening 21'. The upper periphery of the casting 22 is provided with cam surfaces 23 that are adapted to co-operate with the cam surfaces 20 on the casting 14, the upper end of the cylindrical casting 22 telescoping within the lower recessed portion of the cylindrical casting 14.

A helical spring 24 encircles the pin 21' and is compressed against the end wall 25 of the cylindrical casting 22 by a washer 26 that is held in place by a pin 27 which is inserted into a hole in the bottom of the pin 21' through an opening 28 in the side wall of the casting 22.

The action of the spring 24 firmly presses the two cam surfaces 20 and 23 together.

The lower end of the cylindrical casting 22 has a reduced diameter and is adapted to penetrate through an opening 29 in the semi-circular shaped mounting plate 30. The mounting plate 30 has a raised portion 31 surrounding the opening 29 that co-operates with the shoulder 32 formed toward the lower end of the cylindrical casting 22. The mounting plate 30 is provided with a down turned flange 33 along its straight side that is adapted to fit against the edge of a running board 34 of an automobile.

The whole lamp assembly and its bracket is adapted to be suitably mounted on the right hand running board of an automobile by drilling a hole therethrough of sufficient diameter to receive the reduced end portion of the tubular casting 22. This reduced lower end portion is threaded to receive a nut 35 which serves to clamp the whole assembly including the mounting plate to the running board of the vehicle as may be seen in Fig. 1.

Of the two conductors leading to the socket 7 to supply energy to the lamp 8, one is grounded at 36 and the other is led through the tubular member 11 and the tubular pin 21, and casting 22, to the battery through a suitable switch.

When mounted in this position on the running board of the automobile, the lamp shell 1 is turned so as to direct a beam of light directly past the right front wheel so as to illuminate the right hand side of the road. The rubber shell projects beyond the edge of the vehicle so as to direct the beam past the fender. This position of the light serves to illuminate the road in a very satisfactory manner for night driving, it having been found that where the light that illuminates the road originates behind the driver it provides much better conditions. This is true because there is no tendency to create a glare in the eyes of the driver. When the light originates in front of the driver there is always a certain amount that spreads widely at its source and this has been found quite troublesome. In the present instance the light is formed into a beam behind the driver and at a point where he does not see where it originates. This beam throws ditches and other hazards into bold relief. In addition, the beam on the right of the car and extending past it, serves to warn motorists coming from the side at right angles to the car equipped with my improved light of its approach. Again this extended side mounting of the light makes it impossible to cause a glare in the eyes of approaching drivers. This follows from its low position on the running board and also because of the relatively rearward mounting thereupon.

The cam surfaces on the two tubular post or cylindrical members serve to position the lamp as desired with every assurance that it will hold its position. There cam surfaces permit adjustment so the road light may be set to throw its beam as desired and still maintain its position even in the face of very high wind pressure caused by the car traveling at high speed. However, these cam surfaces permit the light to swing back into position above the running board of the car if the lamp should contact with any other object or car in its extended position. The rubber construction of the shell or casing is such that all parts of the lamp are protected so that no impact will damage any part of the lamp. By my improved construction I have found that neither the glass lens or the incandescent lamp is likely to break if my improved road lamp collides with anything when the car upon which it is mounted is travelling at high speed. This is a result of the positioning of the lens and the rubber construction of the shell.

When the lamp swings back into position above the running board of the car, it may be readily returned to position in an obvious manner.

There is another great advantage to the rubber construction of the shell and that is that when it contacts violently with the vehicle on which it is mounted or another vehicle, there is no danger of marring the comparatively delicate finish as would undoubtedly happen if any other construction were employed.

My improved road lamp may also be used as a backing light by simply grasping the rubber shell and turning it with the tubular member 11 pivoting in the socket 13. This directs the beam backwards so as to illuminate the roadway to the rear of the car. The thumb nut 17 may be adjusted to hold the shell 1 firmly in the desired position to focus the beam suitably.

In the form of my invention so far described the road lamp is adapted to be adjusted in a certain definite position. If the lamp collides with anything, it swings back on its pivoted mounting out of the way, and it must be against adjusted to the desired position. In the modified form of my invention showing Figs. 6, 7 and 8, the lamp is maintained in its proper position by a spring, if it collides with any object swings back out of the way and then returns to the desired position. In the Figs. 6 to 8, inclusive, the modification of the mounting bracket including cylindrically shaped castings 14 and 22 are modified to accomplish this result.

The end 50 of the tubular casting 22 is level and is not provided with the corrugated or cam surface. The inner shoulder 20 of the cylindrical casting 14 is also level. One end of a spiral spring 24 is rigidly fastened to the closed end 25 of the tubular casting 22 as may be seen at 51. The other end of the spring 24 is rigidly secured to the washer 27. The washer 27 is maintained upon the tubular pin 21 by pin 52 so that it cannot rotate. The spring 24 thus serves a double purpose, first, that of holding the cylindrical casting 14 in abutting relation to the casting 22 and to hold the casting 14 in a certain definite position. A stud or boss 53 is provided on the inner periphery of the tubular casting 22 and serves to co-operate with a stud or cam 54 on the washer 27. The spring 24 is tensioned and serves to turn the tubular member 14 until the stud 54 engages the boss 53. This construction provides a stop for the tubular member 14 so that the lamp is in a certain definite position to direct the beam forward past the right front wheel of the vehicle. With this construction when the lamp collides with any object, it will swing back as before, tensioning the spring 24. When the obstruction is removed the lamp swings back to its desired position under influence of the spring until the boss 54 contacts with the stop 53. By this form of construction, it is unnecessary for the driver to adjust the position of the lamp given, as this is done automatically.

In this construction also, the lamp may be used as a backing light by turning the rubber shell 22 as before. In all other respects the construction shown in Figs. 6 to 8 is identical with the construction in Figs. 1 to 5, inclusive.

While I have shown and described certain specific constructions of my invention, I am aware that many changes, departures and deviations may be made therefrom, and I desire to protect by Letters Patent all such changes, departures and deviations as come within the scope of the appended claims.

I claim:

1. The combination with a vehicle lamp, a cylindrical casting having an opening therein, a tubular member adapted to telescope said opening, means for attaching said lamp to said member, one end of said casting being hollow and being provided with a cam surface, and a cylindrical member adapted to fit with the hollow portion of said casting and having a co-operating cam surface, said surfaces cooperating frictionally to maintain the casting in a limited number of pre-determined positions with respect to the member.

2. The combination with a vehicle lamp, a cylindrical casting, means for mounting said lamp on said casting, said casting having a hollow end portion, a cylindrical member adapted to fit into the hollow end of said casting and spring means for connecting said casting and said cylindrical member to permit said casting to pivot on said cylindrical member, and a stop for limiting the rotary movement of said casting.

3. A vehicle lamp comprising a casing formed of tough resilient material having an open end provided with a recess around its inner wall spaced away from the periphery at the open end thereof and a reflector of concave shape with a flaring circular edge fitting into said recess to position it in said casing and to strengthen the open end thereof.

4. In combination a vehicle lamp, a pedestal for supporting said lamp, a mounting member having a hollow end adapted to telescope said pedestal, means for rotatably maintaining said mounting member on said pedestal, fastening means for mounting said lamp on the side of said mounting member, a mounting plate having a depending flanged portion adapted to fit over and along the edge of an automobile running board, said mounting plate being provided with an opening which said pedestal is adapted to penetrate and means for clamping said pedestal and mounting plate in abutting relation.

5. In combination a vehicle lamp, a pedestal for supporting said lamp, a mounting member having an open end telescoping said pedestal, spring means for rotatably mounting the mounting member on said pedestal, said spring operating to resiliently maintain said mounting member in a predetermined rotative position with respect to said pedestal and to return the mounting member to said pre-determined position when moved with respect to the pedestal, and fastening means for mounting said pedestal on an automobile.

Signed at Chicago, Illinois, this 11th day of April, 1928.

JOHN F. ANIOL.